Feb. 24, 1931.  C. H. SEAHOLM  1,793,643
ROTARY STEAM ENGINE
Filed March 27, 1924  8 Sheets-Sheet 1

INVENTOR
Charles H. Seaholm
by John M. Cole.
ATTORNEY

Fig. 2.

Feb. 24, 1931.  C. H. SEAHOLM  1,793,643
ROTARY STEAM ENGINE
Filed March 27, 1924  8 Sheets-Sheet 3

Fig.4.

INVENTOR
Charles H. Seaholm
BY
ATTORNEY

Feb. 24, 1931.  C. H. SEAHOLM  1,793,643
ROTARY STEAM ENGINE
Filed March 27, 1924   8 Sheets-Sheet 5

Patented Feb. 24, 1931

1,793,643

UNITED STATES PATENT OFFICE

CHARLES H. SEAHOLM, OF NEW YORK, N. Y.

ROTARY STEAM ENGINE

Application filed March 27, 1924. Serial No. 702,268.

The present invention relates to rotary steam engines, and provides a device suitable for operation by the expansion of steam, or by other gaseous or fluid medium, to produce mechanical power, or as a pump or compressor when mechanically driven.

Various attempts have been made to provide rotary steam engines without much success. They have been wasteful of steam as they were unable to use it expansively. The engines heretofore available have been subject to the disadvantage of the possibility of stopping in a position from which they could not be readily started; i. e. a condition similar to the dead-center of the reciprocating engine was probable. They have been incapable of producing an even flow of power as there were no provisions for an overlapping of the impulses. Furthermore reversibility has been either impossible or exceedingly cumbersome.

On the other hand, the present invention contemplates the provision of a reversible rotary steam engine using the steam expansively and from which one may obtain an even flow of power.

The invention also contemplates the provision of an improved rotary engine having means to vary or adjust the cut-off of the steam while the engine is in operation.

Furthermore the present invention contemplates the provision of a rotary engine from which one can obtain power in either angular direction at will, or from which power may be obtained in both directions simultaneously.

Other and further objects of the invention will be pointed out as the description proceeds.

In the accompanying drawings there are shown, for purposes of illustration, several of the many possible embodiments of the invention, it being understood the invention is susceptible of embodiment in other and different forms.

In the accompanying drawings:

Fig. 17 is a sectional view showing parts of an embodiment of the present invention when arranged to simultaneously operate power shafts on the same axis in opposite directions.

The embodiment of the invention as shown in Figures 1–16 inclusive will first be described, and its operation outlined.

Figure 3:
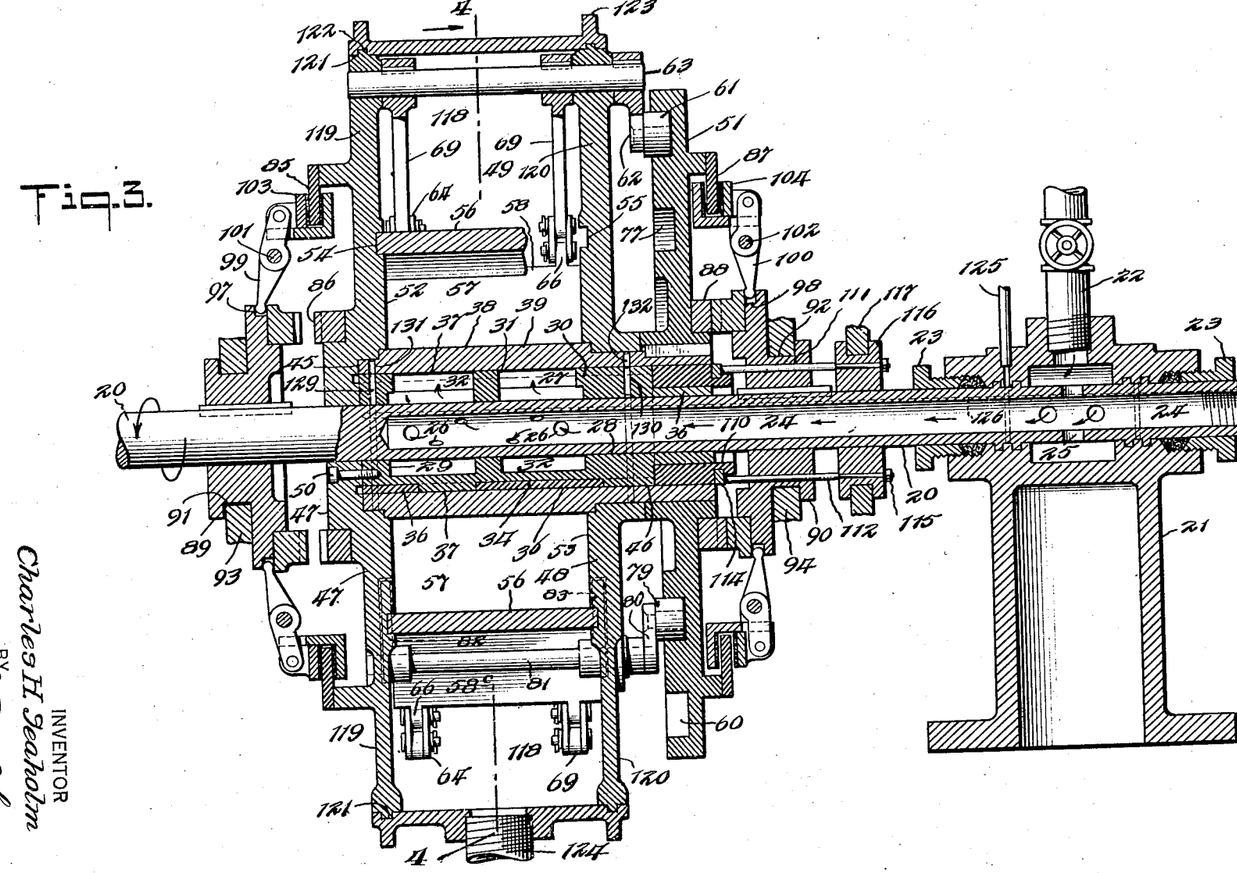
Fig. 3 is a longitudinal section taken on the lines 3—3 of Fig. 1, at an enlarged scale.

A power shaft 20 may be suitably supported in a bearing 21 such as shown in Figure 3. This bearing is provided with a steam inlet pipe 22 and with suitable packed glands or stuffing boxes 23 to provide a steam tight support and housing for the shaft. The shaft is hollow as shown at 24 and suitable holes or ports 25 in the wall of the shaft are provided to permit steam to enter from the bearing housing into the shaft. The other end of the shaft may be supported in any manner desired, and power may be taken from the shaft in any desired manner. For purposes of simplifying the drawings, these features have been omitted.

The hollow shaft is also provided with holes or ports 26 in its walls adapted for communication with an annular space or steam chamber 27 surrounding an intermediate portion of the shaft. The outer walls of this chamber are provided by an arrangement of sleeves and an impeller to be described.

A steam chamber sleeve 28 has a running fit on the outside of the shaft 20 about the holes 26. The ends 29 and 30 of this sleeve and the central portion 31 thereof preferably have a running fit on the shaft, while the intermediate portions 32 and 33 are spaced from the shaft to provide the chamber 27 and are provided with a number of suitably spaced longitudinal ribs 34 between which are steam passages 35 extending through the wall of the steam chamber sleeve. A variable cut-off sleeve 36 is preferably mounted on and associated with the steam chamber sleeve. It will be described in detail later. The two sleeves or the single sleeve, whichever is provided, are preferably provided with a smooth cylindrical outer bearing surface 37.

Figures 6, 7, 8, 9, 10:
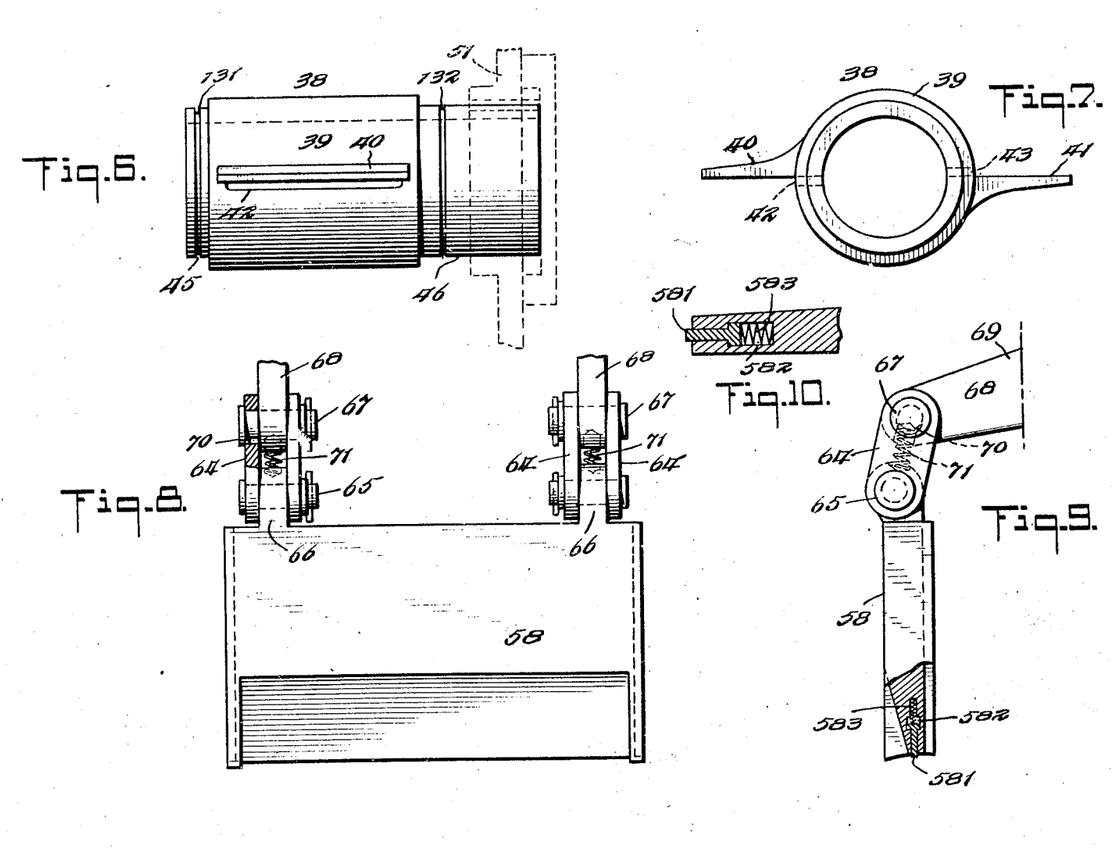
Figs. 6 and 7 are side and end views of an impeller.
Figs. 8 and 9 are side and end views of a sliding gate or abutment and part of the operating mechanism therefor.
Fig. 10 is a cross-sectional view illustrating in detail a form of packing suitable for the impeller and the gates.

A suitable form of impeller 38, such as is illustrated in detail in Figures 6 and 7, surrounds the steam chamber sleeve or sleeves, the body 39 of the impeller having a running fit in the outer surface 37 of the sleeves. This impeller may have two or more wings which are preferably regularly spaced and which extend radially outward from the body of the impeller. It is here shown as having two wings or blades 40 and 41 spaced 180° apart. The body of the impeller is provided with ports 42 and 43 adjacent the wings or blades, the ports being provided in order to permit steam to pass through the body of the impeller when the port is over an opening 35 in the sleeve.

The impeller is here shown as having reduced end portions 45 and 46 on which the end walls 47 and 48 of a shell 49 are rotatably mounted. The shell wall 47 extends inwardly toward the shaft 20 and is coupled in any convenient manner, as by a screw 50, to the steam chamber sleeve 28, so that the sleeve and shell will always maintain the same relative angular position. The other end portion 46 of the impeller extends beyond the other shell wall 48 and has keyed to it a cam plate 51 so that the cam plate and impeller always have the same relative angular position.

The end walls 47 and 48 of the shell are spaced as shown in Fig. 3 so that the impeller blades 41 and 42 may extend from the inner face 52 of one wall to the inner face 53 of the other wall. These faces may be provided with oppositely disposed annular slots or grooves 54 and 55 in which cylindrical segments 56 are mounted in any suitable manner. These segments together with the end walls of the shell provide an annular space 57 surrounding the body of the impeller and through which the impeller wings are adapted to travel.

Figure 4:
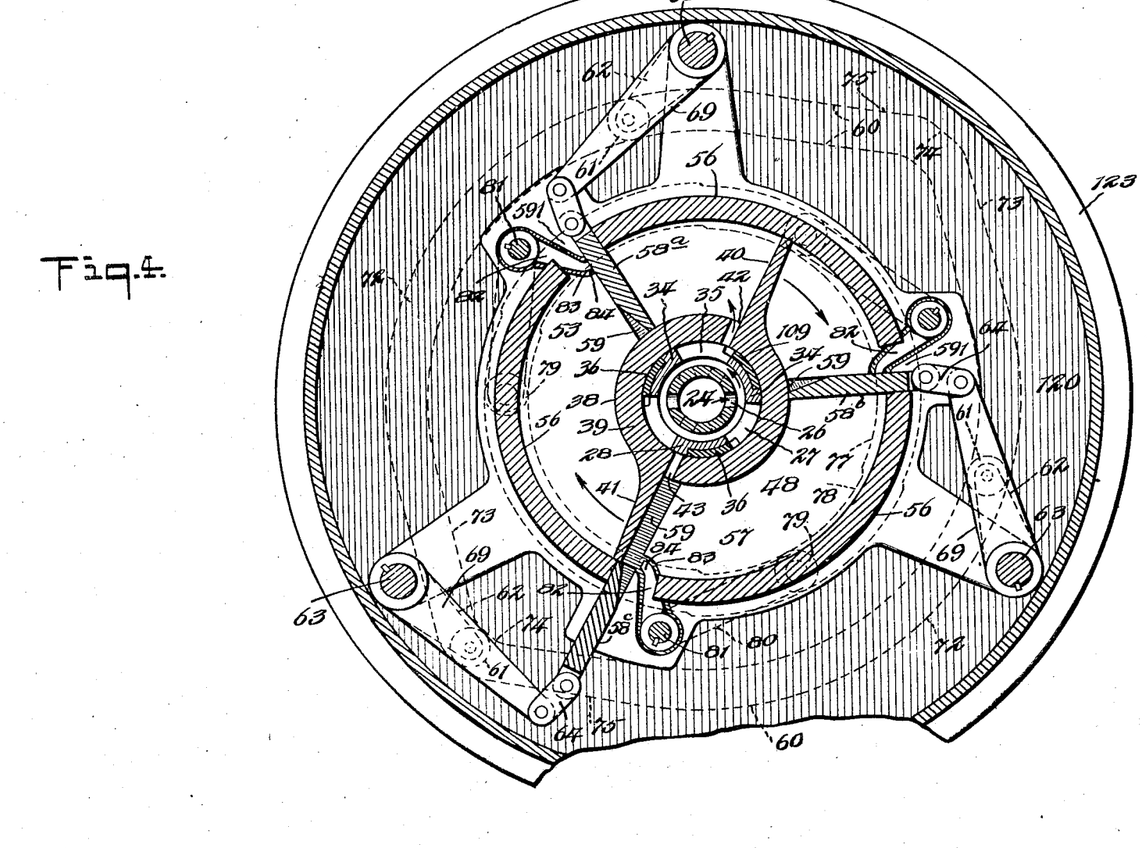
Fig. 4 is a transverse section taken on the lines 4—4 of Figs. 1 and 3 in the direction of the arrows.

The segments may be separated as shown in Fig. 4 so as to provide space for radially reciprocable gates or abutments 58 guided in slots 59 in the inner faces of the shell end walls, and also to provide exhaust ports 591 directly to the rear of the gates. The present drawing shows three gates or abutments 58a, 58b and 58c, and three exhaust ports 591, which correspond in number and angular location with the steam passages 35 in the steam chamber sleeve 28. These parts are, as above described, attached to one another so as to maintain the relative angular positions of the parts. The gates divide the annular space 57 into a plurality of expansion chambers.

The gates or abutments 58 are actuated in any convenient manner. The drawing shows them as being actuated from an outer cam track 60 (Figs. 3–5a inclusive) on the cam plate 51. A follower 61 carried in this cam track is attached to a short crank arm 62 attached to a gate rocker shaft 63 pivotally mounted in the shell 49. There are as many gate rocket shafts 63 as there are gates. Each gate is connected to the corresponding shaft by means of links 64 (shown more clearly in Figs. 8 and 9) pivoted on pins 65 passing through ears 66 on the gates, and in turn pivoted on pins 67 carried by the outer end 68 of rocker arms 69 keyed to the shaft 63. A lost motion connection in the form of an elongated slot 70 in the links 64 is provided, and a spring 71 is interposed between the end 68 of the rocker arm and the ears 66 on the gates.

Figures 5, 5A:
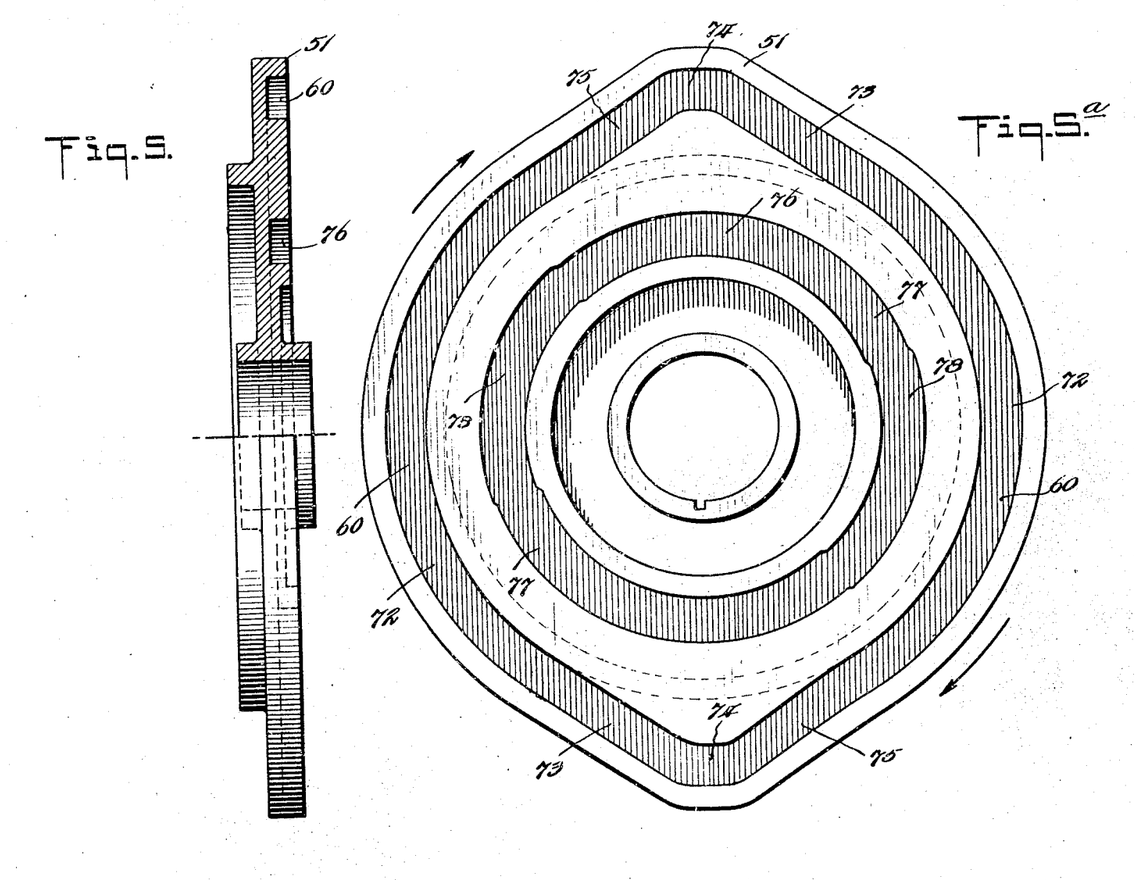
Figs. 5 and 5a are sectional and elevational views respectively of a cam plate.

The cam track 60 in the cam 51 may have the configuration shown in Figures 4 and 5a. As its function is to reciprocate the gates 58 to permit the impeller wings to pass by, it is provided with the same number of lobes as there are wings. As here shown, the cam track has a comparatively long concentric portion 72 corresponding with the period during which the follower 61 is idle and the gate is in its inner position. At the proper time the follower reaches an inclined lifting zone 73 whereby the cam rocks the arm 62, shaft 63 and thereby raises the corresponding gate or abutment 58. It is held in this position while the dwell portion 74 of the cam plate passes by the follower 61. The gate 58c is shown in this position in the lower left hand portion of Figure 4. In this figure the gate 58a and 58b are held in their inner position, the follower 61 being in the inner concentric or dwell portion 72 of the cam track. The inner edge of these gates is held against the body of the impeller by the lost motion pin and slot connection (67— 70) and spring 71. The joint is made steam tight by a packing strip 581 of T-shaped cross section carried, as shown in Figs. 9 and 10, in a slot 582 in the inner edge of the gate, and pressed outwardly by coiled springs 583. Similar packing strips may be used if desired in the sides and end of the wings of the impeller.

The outer dwell, 74 of the cam is made as small as possible and yet permit the impeller blade or wing to pass by the gate which is being held in the outer position. The cam track gradually inclines as shown at 75 from the outer dwell to the inner dwell so as to return the gate to the inner position. The inclines 73 and 75 are made fairly abrupt. Thus it will be seen that the gates may be quickly moved out of the way of the impeller blades, and quickly restored to their inner position when the blade passes by.

Suitable mechanism is also provided to lock the gates or abutments tightly in place while they are in their inner positions so as to prevent the leakage of steam around the gates. The mechanism provided for this purpose is actuated in response to the relative rotation of the cam plate and the shell. According to the present embodiment of the invention, the cam plate 51 is provided with an inner cam track 76 having inner and outer concentric portions 77 and 78 which are adapted to actuate followers 79 located on the free end of the levers 80. These levers are keyed to locking member rocker shafts 81 mounted in the shell 49 adjacent the exhaust ports 591, and locking members 82 are keyed to these shafts and disposed in recesses 83 in the inner faces 52 and 53 of the shell end walls. The outer free ends 84 of these locking members are held against the marginal edges of the gates 58 during the time that the follower 79 is in the smaller diameter portion of the cam track 76, thereby exerting lateral pressure on the gates and holding them firmly against the opposite side of the slot 59. The locking members 82 are shown in engagement with the gates 58a and 58b in Figure 4, while the locking members for the retreated gate 58c are shown in their retreated position, the corresponding follower 79 being on the rise or outer dwell 78. When the lateral pressure of these locking members is removed, the gates or abutments may be moved in or out freely, with a minimum of friction.

From the foregoing it will be apparent that steam may flow from the supply pipe through the hollow shaft and into the steam chamber where it may be admitted through one of the ports in the body of the impeller into an expansion chamber. The ports are shown in Fig. 4 in position for steam to pass through the port 42 into the chamber defined by the blade 40, the gate 58a, an outer segment 56 of the shell, and the body of the impeller. This is a steam tight chamber and the incoming steam reacts against the impeller and the shell tending to rotate them in opposite directions.

Figure 1:
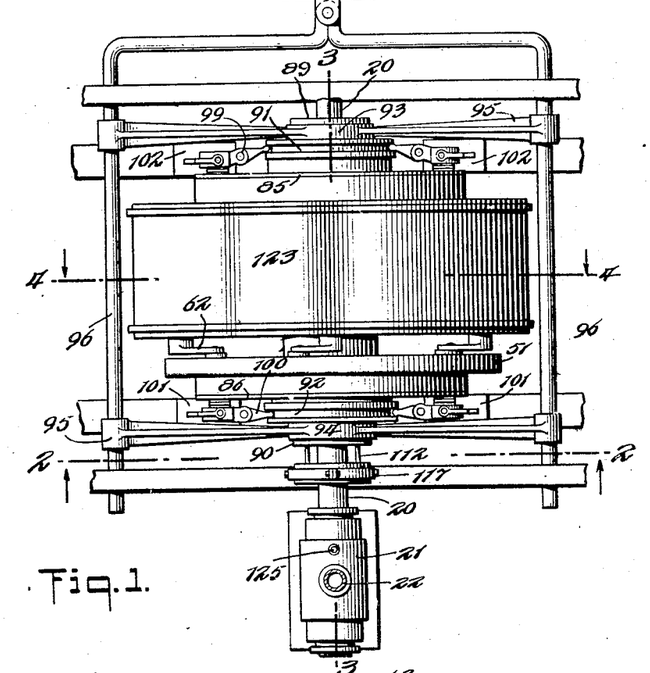
Fig. 1 is a plan view of an embodiment of the present invention arranged to operate a power shaft in either direction at will.
Figure 2:
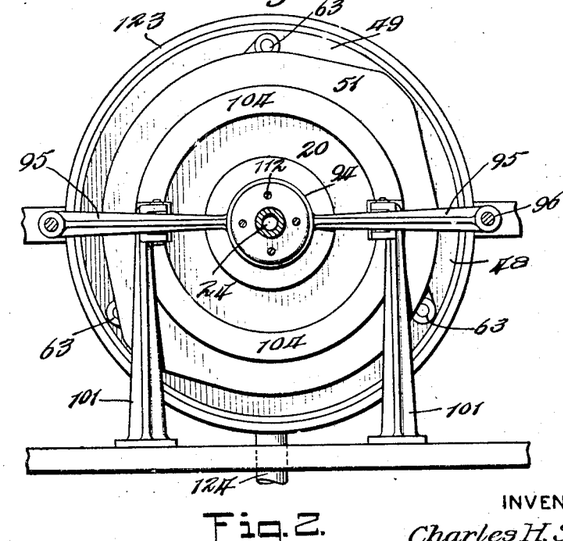
Fig. 2 is a section on the line 2—2 of Fig. 1 looking in the direction of the arrows.

The form of mechanism for utilizing these opposed reactions, as illustrated in Figures 1, 2, and 3, will now be described. The end wall 47 of the shell 49 is provided with an outer friction surface 85 and an inner clutch element 86, while the cam plate 51 is similarly provided with an outer friction surface 87 and a clutch element 88. In the present case both these clutches are right handed. These friction surfaces and clutches are similarly arranged on these parts and suitable mechanism is provided for clutching one part to the shaft and simultaneously locking the other part against rotation.

Cooperative clutch elements 89 and 90 are slidably keyed to the shaft 20 so as to be engaged with or disengaged from the clutch elements 86 and 88. These slidable elements are provided with annular grooves 91 and 92 in which are mounted straps 93 and 94. These straps are carried on members 95 attached to a sliding frame work 96 suitably supported about the machine. The sliding of this framework slides the clutch elements into or out of engagement thereby coupling one or the other of the reaction elements of the engine to the power shaft.

The sliding clutch parts 89 and 90 are each provided with grooves 97 and 98 adapted to cooperate with levers 99 and 100 pivoted on stationary frames 101 and 102 disposed alongside the clutches. The outer ends of the levers 99 and 100 are operatively connected with non-rotatable friction rings 103 and 104 in such a manner as to clamp one of them against the adjacent friction surface on the reactive parts of the engine which is not clutched to the shaft. In this manner either the shell or the impeller may be held stationary while the other is coupled to the shaft to drive it. The direction in which the shaft is driven will depend upon which of these parts is coupled to it. Hence, in the embodiment of the invention under discussion either the shell or the impeller may be stationary. This makes no essential difference in the operation of the inner parts of the engine as this operation depends merely upon the relative rotation of the various parts.

The present engine is, as above intimated, provided with a variable cut-off adjustable during the operation of the engine. This variable cut-off may be manually actuated to vary the power output of the engine or may be under the control of a governor to vary the speed of the engine.

A convenient embodiment of this variable cut-off mechanism is shown in Figures 1 to 4 inclusive and Figures 11 to 16 inclusive. Inasmuch as the shell and impeller are both rotatable relative to the shaft, it is necessary that the variable cut-off mechanism be operable by devices unaffected by the rotation of these parts.

As more clearly shown in Figures 11–14 inclusive, the ribs 34 of the steam chamber sleeve are of L-shaped cross section, and the solid portions 28 and 29 of the sleeve are provided with spiral slots 105 and 106. The variable cut-off sleeve 36 is provided with helical members 107 and 108 cooperable with the spiral slots in the steam chamber sleeve, and with ribs 109 adapted to lie inside the L-shaped ribs of the steam chamber sleeve. The ribs 109 and 34 provide the discontinuous cylindrical surface 37 on which the body of the impeller may revolve.

Figures 11, 12, 13, 14, 15, 16:
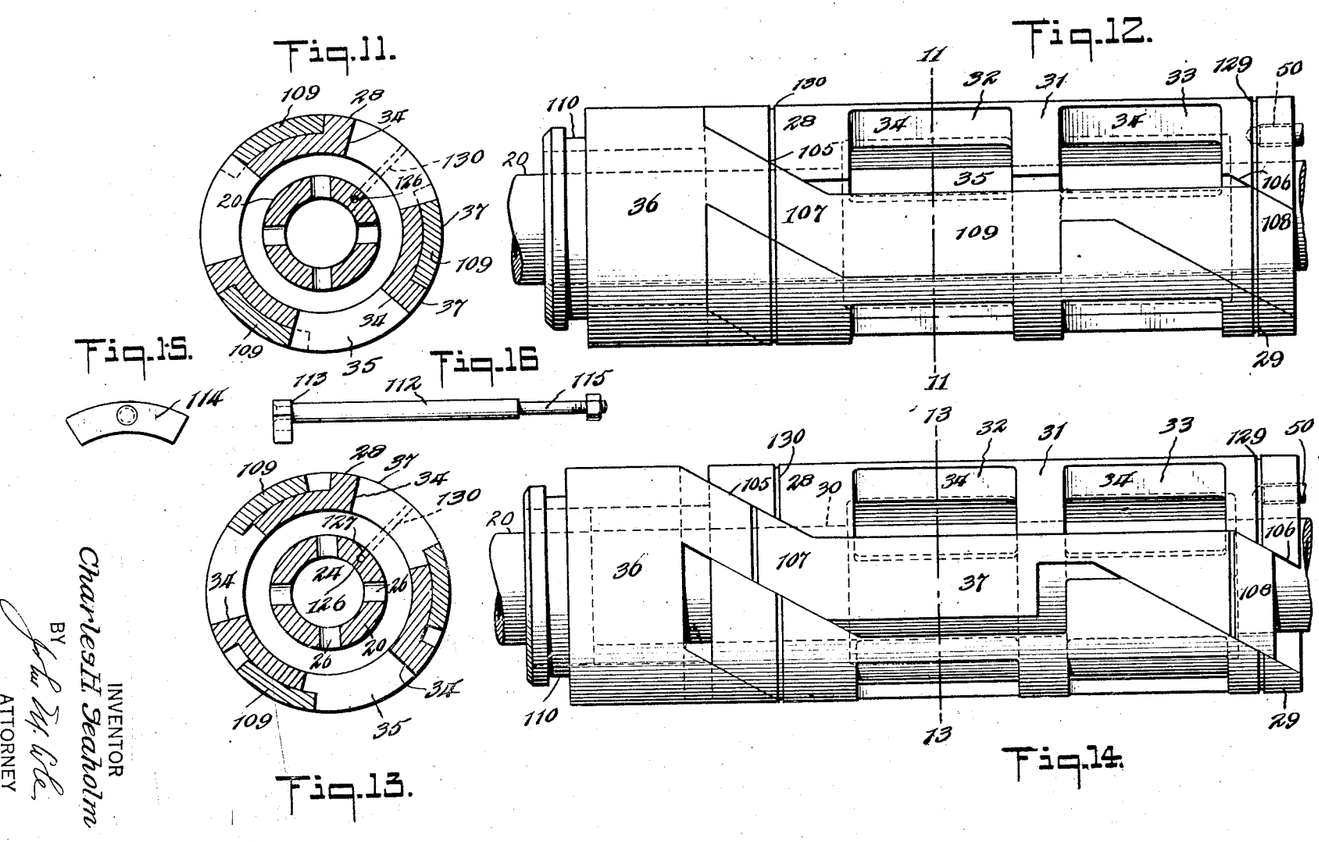
Figs. 11 and 12 are sectional and side elevational views, respectively, of a variable cut-off mechanism showing the parts in one position.
Fig. 13 and 14 are views similar to those of Figs. 11 and 12 showing the parts in a different position.
Figs. 15 and 16 are end and side elevational views of a detail of the mechanism for actuating the variable cut-off sleeve.
Figure 12:
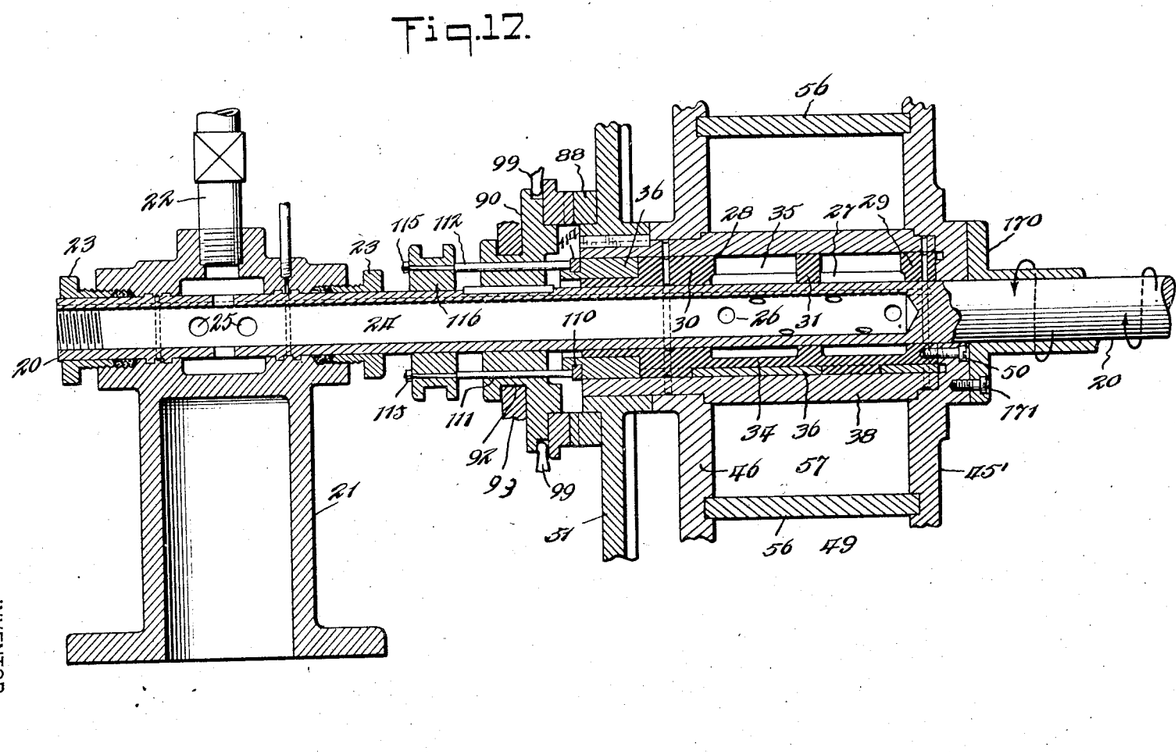

By comparison of Figures 11 and 12 with Figures 13 and 14, respectively, it will be noticed that the variable cut-off sleeve has been moved to the left in Figure 14. This movement has caused rotation of the variable cut-off sleeve relative to the steam chamber sleeve and has caused the ribs 109 to assume such a position that the steam passage 35 has been constricted. It is also obvious that the angle occupied by the two ribs has been increased correspondingly.

The cut-off sleeve is provided with an annular groove 110 on the end which extends out beyond the steam chamber sleeve, whereby it may be moved along the axis of the shaft. The sliding clutch member 90 is provided with suitable holes 111 through which rods 112 may slide. The inner ends 113 of these rods are coupled to segments 114 carried in the annular groove 110 while the outer ends 115 of the rods are coupled to a sliding collar 116 loosely carried by the shaft outside the clutch member 90. This collar may be slid along the shaft by any convenient device, as for example, by a strap 117 carried in a groove 116. The sliding of the collar will slide the rods 112 in the holes 111 in the clutch part, irrespective of whether it is rotating or not. The segments 114 and the cut-off sleeve 36 will be rotating relative to one another, but the segments will pull or push the sleeve as the case may be, and thereby vary the time during which steam is admitted to the expansion chamber.

The exhaust steam as it passes out through ports 591 enters a receiver 118 formed by extending the end walls 47 and 48 of the shell outwardly as shown at 119 and 120. These extensions support the rocker shafts 63 and 81 and are fastened together in any suitable manner, as by bolts, not shown. These parts of the receiver are, of course, rotatable. To conduct the exhaust steam to a condenser, there is provided a stationary casing having a steam tight joint with the rotatable parts. A simple arrangement is here shown. The peripheral edges of the extensions 119 and 120 are provided with tongues 121 cooperable with grooves 122 in a stationary cylindrical member 123, thereby providing a steam tight receiver for the exhaust steam and condensate formed in the receiver which may pass to a condenser through a pipe 124.

A lubricating system for the inner parts of the engine is also shown in the drawings. The lubricant is admitted through a pipe 125 which leads to the bearings in the housing 21. It also reaches a hole 126 drilled in the wall of the hollow shaft and is thereby carried to lateral openings 127 which distribute it to the outside of the shaft 20 adjacent the drillings 128 and 129 in the steam chamber sleeve 38. These drillings carry the lubricant out to the impeller, and drillings 130 and 131 in the ends of the impeller distribute the lubricant to these end bearings. In this manner the lubricant reaches all these parts of the machine, it also becomes mixed with the steam in the steam chamber and is carried into the expansion chambers to lubricate the impeller blades, the gates, and the walls of the shell. As the steam is exhausted into the receiver the lubricant is carried out onto the gate operating and locking mechanism, and finally into the condenser in an obvious manner.

The modified form of the invention shown in Figure 17 is arranged so that power may be obtained from two concentric shafts operating in opposite directions. The figure of the drawing shows only the central part of the machine, it being understood that the outer portions of the shell, cam, etc., are substantially as shown heretofore. The same reference characters are used for these common parts which appear in this figure. This form of the invention omits the shell clutch 86 and the friction element 85 used in the form shown in Figs. 1 to 3. Here the shell end wall 45' is coupled to a sleeve 170 by bolts 171. This sleeve surrounds the shaft 20 and is adapted to be driven in a counter-clockwise direction as indicated. The cam 51 and impeller 38 may be coupled to the shaft 20 as heretofore, so as to drive the shaft in the opposite direction as indicated, or this cam and impeller may be locked against rotation whereby the shaft 20 will become idle. An engine built according to the present showing would be adapted for use where it is desirable to simultaneously obtain power in opposite directions, as for example in operating both right and left hand propellers, or in driving an automobile. This form of engine is highly efficient as the double rotation of the shell and impeller permit the utilization of high steam velocities even though the parts are moving at relatively low speeds.

Figure 18:
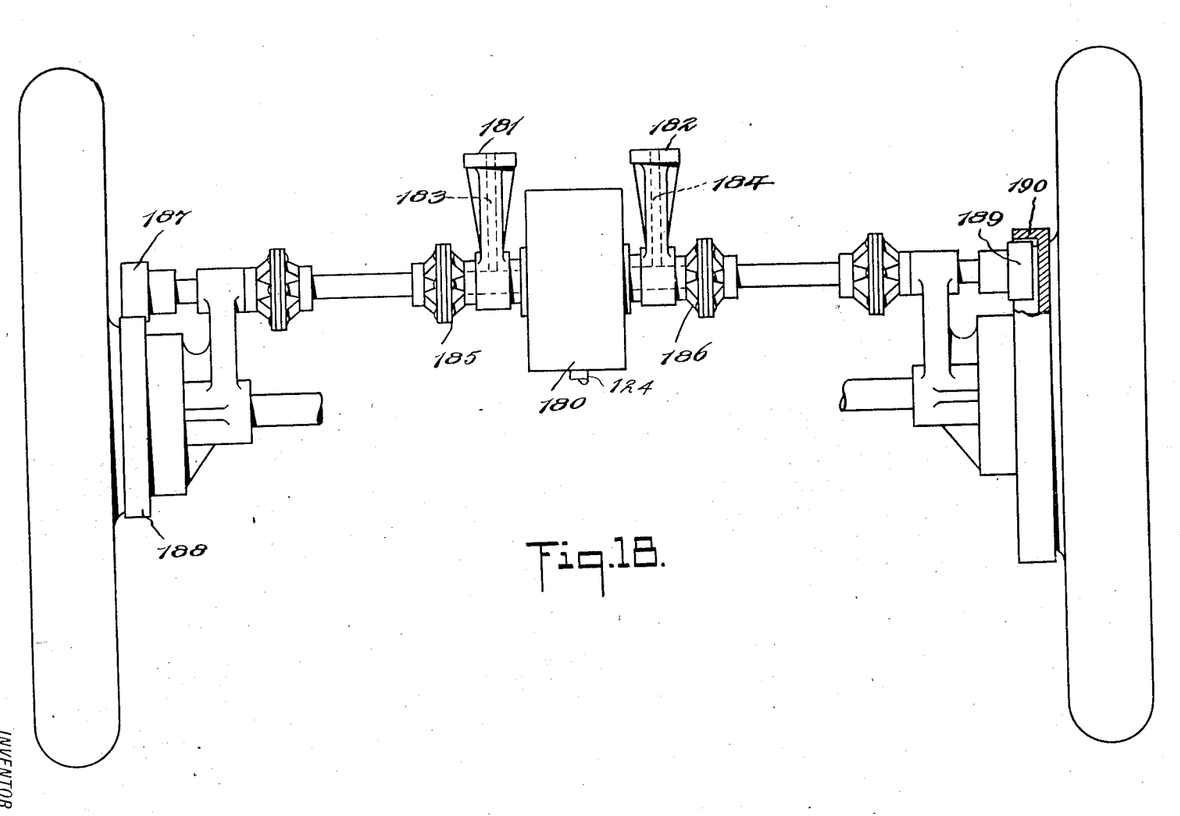
Fig. 18 illustrates an automobile power plant utilizing the present invention.

Figure 18 shows, schematically, the installation of a machine, of the type illustrated in Figure 17, as the power plant of an automobile. The engine is shown at 180. It is hung underneath the chassis on hangers 181 and 182 which include steam conduits 183 and 184, both of the conduits leading to the inside steam chamber while the exhaust from the outside receiver passes through pipe 124 to the condenser. Steam may be used in the engine as heretofore described and the shafts 185 and 186 will be driven in opposite directions. One of these shafts is connected through suitable universal couplings with a pinion 187 on the outside of a gear 188 coupled with one road wheel, while the other shaft is similarly connected with a gear 189 inside a gear 190 coupled to the other road wheel. It will thus appear that there has been provided a form of automobile power plant which eliminates the transmission and differential, the engine acting as its own differential.

The rotary engine above described has no dead center on account of the overlapping of the impulses. No matter in what position the engine is stopped, there will be a port in the impeller body over a port in the steam chamber sleeve so that steam may enter an expansion chamber. The present drawings show an impeller having two intake orifices and two blades, and a shell having three gates or abutments together with three exhaust ports, and three ports in the steam chamber sleeve. The overlapping of the impulses may be obtained by other arrangements utilizing more abutments than wings.

In the ordinary operation of the engine the high pressure steam enters through a hollow shaft and exhausts at low pressure through a peripherally disposed annular chamber. It is therefore feasible to have large exhaust ports to care for the greater volume of steam thereby resulting in a minimum of back pressure and reducing the noise. The variable cut-off may be adjusted while the engine is in operation, making it possible to economize on steam consumption when the engine is running.

With the engine herein described, it is possible to obtain power in either direction at will or in both directions simultaneously without the use of gears or other transmission devices. When used as an automobile power plant it is possible to place the axis of the rotating parts transverse of the chassis thereby eliminating vibration, as well as materially reducing the unsprung weight. The engine is also well adapted for marine work and other places where it is desirable to develop rotary power in a power plant supported in a structure which is not fixed. The engine produces equal and opposite torque about one axis which neutralizes so that there is no tendency to twist or turn the boat or aircraft out of its course.

While the foregoing specification has specifically referred to the use of steam for producing motive power, I would have it understood that the engine is suitable for use with other liquid or gaseous mediums to produce power, or it is suitable for use as a compressor or pump when mechanically driven.

It is obvious that the invention may be embodied in many forms and constructions, and I wish it to be understood that the particular forms shown are but a few of the many forms. Various modifications and changes being possible, I do not limit myself in any way with respect thereto.

What is claimed is:

1. A rotary steam engine, having members provided with cooperable wings and gates to provide a plurality of annularly arranged expansion chambers, means to move each gate out of the path of a wing to permit said wing to pass by, and means to apply lateral pressure to each gate when it is in the inner position to hold it steam tight and to remove the lateral pressure when the gate is moving.

2. A rotary steam engine, having a main shaft, members provided with cooperable wings and gates to provide a plurality of annularly arranged expansion chambers, all of said members being mounted on the shaft, certain of said members being fastened to the shaft to rotate therewith, others of said members being locked against rotation, and shaft controlled means to move each gate out of the path of a wing to permit said wing to pass by, said shaft being hollow for supplying steam to the expansion chambers.

3. A rotary steam engine, having members provided with cooperable wings and gates to provide a plurality of annularly arranged expansion chambers, means to move each gate out of the path of a wing to permit said wing to pass by, and an annular receiver outside the expansion chambers for the exhaust steam, said gates when in their outer position being in the annular receiver, surrounded by the exhaust steam and at the pressure of the exhaust steam thereby eliminating packing about the gates when in this position and preventing their cooling.

4. A rotary steam engine, having a main shaft members provided with cooperable wings and gates to provide a plurality of annularly arranged expansion chambers, means to move each gate out of the path of a wing to permit said wing to pass by, the shaft being hollow for supplying steam to the expansion chambers, and an annular receiver outside the expansion chambers for the exhaust steam, said gates, when in their outer position being in the annular receiver, surrounded by the exhaust steam and at the pressure of the exhaust steam thereby eliminating packing about the gates when in this position and preventing their cooling.

5. A rotary steam engine, having members provided with cooperable wings and gates to provide a plurality of annularly arranged expansion chambers, means to move each gate out of the path of a wing to permit said wing to pass by, the wings and gates being so disposed as to produce overlapping impulses, and means to apply lateral pressure to each gate when it is in the inner position to hold it steam tight and to remove the lateral pressure when the gate is moving.

6. A rotary steam engine, having a main shaft members provided with cooperable wings and gates to provide a plurality of annularly arranged expansion chambers, means to move each gate out of the path of a wing to permit said wing to pass by, said shaft being hollow for supplying steam to the expansion chambers, and an adjustably mounted ported sleeve surrounding the hollow shaft for varying the time of cut off of steam admitted to the expansion chambers.

7. A rotary steam engine, having members provided with cooperable wings and gates to provide a plurality of annularly arranged expansion chambers, means to move each gate out of the path of a wing to permit said wing to pass by, a rotatably mounted hollow shaft for supplying steam to the expansion chambers, and a clutch mechanism for selectively coupling either member to the shaft for bodily rotation therewith, the other member being thereby simultaneously uncoupled from the shaft.

8. A rotary steam engine, having members provided with cooperable wings and gates to provide a plurality of annularly arranged expansion chambers, means to move each gate out of the path of a wing to permit said wing to pass by, a rotatably mounted hollow shaft for supplying steam to the expansion chambers, and a clutch mechanism for selectively coupling either member to the shaft for bodily rotation therewith, the other member being thereby locked against rotation.

9. A rotary steam engine, having members provided with cooperable wings and gates to provide a plurality of annularly arranged expansion chambers, means to move each gate out of the path of a wing to permit said wing to pass by, a rotatably mounted hollow shaft for supplying steam to the expansion chambers, an annular receiver outside the expansion chambers for the exhaust steam, and a clutch mechanism for selectively coupling either member to the shaft for bodily rotation therewith, the other member being thereby simultaneously uncoupled from the shaft.

10. A rotary steam engine, having a hollow main shaft members provided with cooperable wings and gates to provide a plurality of annularly arranged expansion chambers, means to move each gate out of the path of a wing to permit said wing to pass by, the wings and gates being so disposed as to produce overlapping impulses, the main shaft having steam ports, and an adjustably mounted ported sleeve surrounding the hollow shaft for varying the time of cut off of steam admitted to the expansion chambers.

11. A rotary steam engine, having members provided with cooperable wings and gates to provide a plurality of annularly arranged expansion chambers, means to move each gate out of the path of a wing to permit said wing to pass by, the shaft having steam ports, an adjustably mounted ported sleeve surrounding the shaft for varying the time of cut-off of steam admitted to the expansion chambers, and a clutch mechanism for selectively coupling either member to the shaft for bodily rotation therewith, the other member being thereby simultaneously uncoupled from the shaft.

12. A rotary steam engine, having members provided with cooperable wings and gates to provide a plurality of annularly arranged expansion chambers, means to move each gate out of the path of a wing to permit said wing to pass by, the wings and gates being so disposed as to produce overlapping impulses, a rotatably mounted hollow shaft for supplying steam to the expansion chambers, an annular receiver outside the expansion chambers, the shaft having steam ports, an adjustably mountd ported sleeve surrounding the shaft for varying the time of cut-off of steam admitted to the expansion chambers, and a clutch mechanism for selectively coupling either member to the shaft for bodily rotation therewith, the other member being thereby locked against rotation.

13. In a rotary steam engine, the combination with reaction elements mounted for relative rotation about the axis of a shaft, of means for producing opposed reactions between said elements upon the passage of steam, and power transmission devices connectible to said elements to transmit power in either angular direction, the reaction producing means including a concentric steam cut off sleeve attached to one of said rotatable parts to rotate therewith about the shaft.

14. In a rotary steam engine, the combination with an impeller and a shell each mounted for relative rotation about the axis of a shaft, of means for producing opposed reactions between said impeller and shell upon the passage of steam, the reaction producing means including a concentric steam cut off sleeve attached to one of said rotatable parts to rotate therewith about the shaft, and power transmission devices connectible to said impeller and shell to transmit power in either angular direction.

15. In a rotary steam engine, in combination an impeller and a shell each supported for relative rotation about an axis, means for producing opposed reactions between said impeller and shell upon the passage of steam, a shaft, the reaction producing means including a concentric steam cut off sleeve attached to one of said rotatable parts to rotate therewith about the shaft, means for coupling either the impeller or the shell to the shaft whereby power in either angular direction may be obtained, and means for simultaneously locking the other against rotation.

16. A rotary steam engine, having a hollow shaft, a winged impelled rotatable with respect to the axis of the shaft, a shell also rotatable with respect to the axis of the shaft, gate mechanism rotatable with the shell, a cam rotatable with the impeller and interconnected with the gate mechanism, the parts being so arranged that the passage of steam tends to rotate the parts in opposite directions, and means for coupling one of the rotatable parts to the shaft.

17. A rotary steam engine, having a hollow shaft, a steam chamber sleeve loosely mounted on the shaft, a shell coupled to the sleeve, an impeller rotatably carried on the sleeve, means to clutch either the impeller or the shell to the shaft, a variable cut-off sleeve associated with the steam chamber sleeve and the impeller, and means for adjusting said sleeve irrespective of which of the parts is clutched to the shaft.

18. A rotary steam engine, having a shaft, a shell provided with movable abutments or gates, an impeller carried on the shaft, and a cam plate fastened to the impeller and having cam means for controlling the actuation of the abutments or gates of the engine.

19. A rotary steam engine, having a shaft, a shell provided with movable abutments or gates, an impeller carried on the shaft, a cam plate fastened to the impeller and having cam means for controlling the actuation of of the abutments or gates of the engine, and a releasable clutch interconnecting the shaft and cam plate.

20. A rotary steam engine, having a shaft, a shell provided with movable abutments or gates, an impeller carried on the shaft, a cam plate fastened to the impeller and having cam means for controlling the actuation of the abutments or gates of the engine, and means for locking the cam plate to prevent rotation thereof.

21. A rotary steam engine, having a shaft a shell provided with movable abutments or gates, an impeller carried on the shaft, a cam plate fastened to the impeller and having cam means for controlling the actuation of the abutments or gates of the engine, a releasable clutch interconnecting the shaft and cam plate, and means for locking the cam plate to prevent rotation thereof when the clutch is released.

22. A rotary steam engine, having a shaft, a shell provided with movable abutments or gates, an impeller carried on the shaft, said impeller comprising a cylindrical body having a plurality of wings extending outwardly from the body and ports in the wall of the body adjacent each wing, and a cam plate fastened to the impeller and having cam means for controlling the actuation of the abutments or gates of the engine.

23. In a rotary steam engine, a shaft, a steam chamber sleeve, and an impeller, having a body rotatably mounted about the sleeve, which sleeve is rotatably mounted on the shaft, the shaft having a steam passage adapted to introduce steam into the space between the shaft and the body of the impeller, the impeller having admission ports adapted to be opened and closed by the sleeve during the rotation of one relative to the other.

24. In a rotary steam engine, a shaft, a steam chamber sleeve rotatable relative to the shaft, an impeller having a body rotatably mounted about the sleeve and concentric with the shaft, the impeller having admission ports adapted to be opened and closed by the sleeve during the rotation of one relative to the other, and means to vary the angle during which the ports are open, said means being adjustable while the engine is in operation.

25. In a rotary steam engine, a shaft, a steam chamber sleeve, an impeller, having a body rotatably mounted about the sleeve, which sleeve is rotatably mounted on the shaft, the shaft having a steam passage adapted to introduce steam into the space between the shaft and the body of the impeller, the impeller having admission ports adapted to be opened and closed by the sleeve during the rotation of one relative to the other, and a variable cut-off sleeve intermediate the steam chamber sleeve and the impeller for varying the angle during which the ports are open.

26. In a rotary steam engine, a shaft, a steam chamber sleeve, an impeller having a body rotatably mounted about the sleeve, which sleeve is rotatably mounted on the shaft, the shaft having a steam passage adapted to introduce steam into the space between the shaft and the body of the impeller, the impeller having admission ports adapted to be opened and closed by the sleeve during the rotation of one relative to the other, and a variable cut-off sleeve bodily carried on the steam chamber sleeve, mounted thereon for longitudinal reciprocation and for limited angular movement, and carried intermediate the steam chamber sleeve and the impeller for varying the angle during which the ports are open.

27. In a rotary steam engine, a shaft, a steam chamber sleeve, an impeller having a body rotatably mounted about the sleeve, which sleeve is rotatably mounted on the shaft, the shaft having a steam passage adapted to introduce steam into the space between the shaft and the body of the impeller, the impeller having admission ports adapted to be opened and closed by the sleeve during the rotation of one relative to the other, a variable cut-off sleeve bodily carried on the steam chamber sleeve, mounted thereon for longitudinal reciprocation and for limited angular movement, and carried intermediate the steam chamber sleeve and the impeller for varying the angle during which the ports are open, and means to vary the position of the cut-off sleeve while the parts are rotating.

28. In a rotary steam engine, a variable cut-off device comprising a rotatably mounted steam chamber sleeve having ports in its walls, a cut-off sleeve carried on the steam chamber sleeve for reciprocation along the steam chamber sleeve and for bodily rotation therewith when it rotates, and means to vary the angular position of the sleeves to vary the effective opening of the ports and a rotatably mounted impeller body surrounding the sleeves and having ports corresponding with the ports in the cut-off device.

29. In a rotary steam engine, a variable cut-off device comprising a rotatably mounted steam chamber sleeve having ports in its walls, a cut-off sleeve carried on the steam chamber sleeve for reciprocation along the steam chamber sleeve and for bodily rotation therewith when it rotates, there being a spiral connection between the sleeves whereby longitudinal movement of the cut-off sleeve will move it angularly to vary the effective opening of the ports and a rotatably mounted impeller body surrounding the sleeves and having ports corresponding with the ports in the cut-off device.

30. In a rotary steam engine, a variable cut-off device comprising a rotatably mounted steam chamber sleeve having ports in its walls, a cut-off sleeve carried on the steam chamber sleeve for reciprocation along the steam chamber sleeve and for bodily rotation therewith when it rotates, and means to vary the angular position of the sleeves to vary the effective opening of the ports, said means being operable while the sleeves are rotating and a rotatably mounted impeller body surrounding the sleeves and having ports corresponding with the ports in the cut-off device.

31. In a rotary steam engine, a variable cut-off device comprising a rotatably mounted steam chamber sleeve having ports in its walls, a cut-off sleeve carried on the steam chamber sleeve for reciprocation along the steam chamber sleeve and for bodily rotation therewith when it rotates, there being a spiral connection between the sleeves whereby longitudinal movement of the cut-off sleeve will move it angularly to vary the effective opening of the ports, means for longitudinally moving the cut-off sleeve while both sleeves are rotating and a rotatably mounted impeller body surrounding the sleeves and having ports corresponding with the ports in the cut-off device.

32. In a rotary steam engine, a shaft, a shell supported from the shaft, said shell having an annular chamber, reciprocable gates or abutments transverse of said chamber, there being exhaust ports adjacent the gates, and an annular receiver outside the exhaust ports to receive the exhaust steam, said gates when in their outer position being in the annular receiver and surrounded by the exhaust steam.

33. In a rotary steam engine, a shaft, a shell supported from the shaft, said shell having spaced end walls, a plurality of radially reciprocable gates or abutments extending from one wall to the other wall, and circumferentially disposed segments extending from one gate nearly to the other gate to provide exhaust ports.

34. In a rotary steam engine, a shaft, a shell supported from the shaft, said shell having spaced end walls having radial guide ways, reciprocable gates or abutments carried in the guideways, and extending from one wall to the other wall, means for reciprocating the gates, and means for exerting lateral pressure on each gate.

35. In a rotary steam engine, a shaft, a shell supported from the shaft, said shell having spaced end walls having radial guide ways, reciprocable gates or abutments carried in the guideways, and extending from one wall to the other wall, means for reciprocating the gates, means for exerting lateral pressure on each gate, and circumferentially disposed segments extending from one gate nearly to the other gate.

36. In a rotary steam engine, a shaft, a shell supported from the shaft, said shell having an annular chamber, reciprocable gates or abutments transverse of said chamber, there being exhaust ports adjacent the gates, and means to couple the shell to the shaft for rotation therewith, or to free it from the shaft and lock it against rotation.

37. In a rotary steam engine, a shaft, a cam plate, and a shell, one of which is rotatable on the shaft relative to the other, a plurality of gates reciprocably carried inside the shell, means associated with the gates and operated by the cam in response to rotation of one of said parts relative to the other for reciprocating the gates, and means for applying lateral pressure to each gate when it is in its inner position.

38. In a rotary steam engine, a shaft, a cam plate, and a shell, one of which is rotatable on the shaft relative to the other, a plurality of gates reciprocably carried inside the shell, links connected with the gates mounted on shafts carried by the shell, and arms operable by the cam plate for rocking the shafts and reciprocating the gates, and means to apply lateral pressure to each gate when it is in the inner position to hold it steam tight and to remove the lateral pressure when the gate is moving.

39. In a rotary steam engine, a shaft, a cam plate, and a shell, one of which is rotatable on the shaft relative to the other, a plurality of gates reciprocably carried inside the shell, links connected with the gates and mounted on shafts carried by the shell, arms operable by the cam plate for rocking the shafts and reciprocating the gates, and means for applying lateral pressure to each gate when in its inner position.

40. In a rotary steam engine, a shaft, a cam plate, and a shell, one of which is rotatable on the shaft relative to the other, a plurality of gates reciprocably carried inside the shell, means associated with the gates and operated by the cam in response to rotation of one of said parts relative to the other for reciprocating the gates, locking members carried by the shell adjacent the gates, and cam operated means for forcing the locking members against the gates when in their inner position to apply lateral pressure.

41. In a rotary steam engine, a shaft, a cam plate, and a shell, one of which is rotatable on the shaft relative to the other, a plurality of gates reciprocably carried inside the shell, links connected with the gates and mounted on shafts carried by the shell, arms operable by the cam plate for rocking the shafts and reciprocating the gates, locking members carried by the shell adjacent the gates, and cam operated means for forcing the locking members against the gates when in their inner position to apply lateral pressure.

42. In a rotary steam engine, a shaft, an impeller and a revolvable shell both carried on the shaft, each being rotatable about the axis of the shaft independent of the rotation of the other, the impeller having wings for transversing an annular chamber in the shell and having inlet ports adjacent each wing, a plurality of gates of greater number than there are wings on the impeller, said gates being reciprocably carried in the shell and disposed across said chamber, exhaust ports adjacent each gate, and cam operated devices for moving each gate outwardly upon the approach of a wing and for returning the gate after passage of the wing.

43. In a rotary steam engine, a shaft, an impeller and a revolvable shell both carried on the shaft, each being rotatable about the axis of the shaft independent of the rotation of the other, the impeller having wings for transversing an annular chamber in the shell and having inlet ports adjacent each wing, a plurality of gates of greater number than there are wings on the impeller, said gates being reciprocably carried in the shell and disposed across said chamber, exhaust ports adjacent each gate, a cam rotatable with the impeller, and devices operable by the relative rotation of the cam and shell for moving each gate outwardly beyond a wing upon the approach thereof.

44. In a rotary steam engine, a shaft, an impeller and a shell both carried on the shaft and being rotatable about the axis of the shaft relative to one another, the impeller having wings for transversing an annular chamber in the shell, a plurality of gates of greater number than there are wings on the impeller, said gates being reciprocably carried in the shell and disposed across said chamber, cam operated devices for moving each gate outwardly upon the approach of a wing and for returning the gate after passage of the wing, and cam operated means to apply lateral pressure to each gate when in its inner position.

45. In a rotary steam engine, a shaft, an impeller and a shell both carried on the shaft and being rotatable about the axis of the shaft relative to one another, the impeller having wings for transversing an annular chamber in the shell, a plurality of gates of greater number than there are wings on the impeller, said gates being reciprocably carried in the shell and disposed across said chamber, a cam rotatable with the impeller, devices operable by the relative rotation of the cam and shell for moving each gate outwardly beyond a wing upon the approach thereof, and cam operated means to apply lateral pressure to each gate when in its inner position.

46. In a rotary steam engine, a hollow shaft, and a steam chamber surrounding the shaft and in communication with the interior of the shaft, the outside of the steam chamber being formed by the inside of a ported impeller body supported from the shaft and by a ported sleeve which is mounted on the shaft and which opens and closes the ports in the impeller body upon the relative rotation of the body and sleeve.

47. In a rotary steam engine, a hollow shaft, a steam chamber surrounding the shaft and in communication with the interior of the shaft, the outside of the steam chamber being formed by the inside of a ported impeller body supported from the shaft and by a ported sleeve which is mounted on the shaft and which opens and closes the ports in the impeller body upon the relative rotation of the body and sleeve, the impeller having outwardly directed wings, a shell mounted on the shaft and having an annular space adapted to be traversed by the wings, radially reciprocable gates carried by the shell and adapted to divide the annular space into a plurality of expansion chambers, and exhaust ports leading from the said annular space.

48. In a rotary steam engine, a hollow shaft, a steam chamber surrounding the shaft and in communication with the interior of the shaft, the outside of the steam chamber being formed by the inside of a ported impeller body supported from the shaft and by a ported sleeve which is mounted on the shaft and which opens and closes the ports in the impeller body upon the relative rotation of the body and sleeve, the impeller having outwardly directed wings, a shell mounted on the shaft and having an annular space adapted to be traversed by the wings, radially reciprocable gates carried by the shell and adapted to divide the annular space into a plurality of expansion chambers, exhaust ports leading from the said annular space, and a low pressure receiver connected with the exhaust ports.

49. In a rotary steam engine, a hollow shaft, a steam chamber surrounding the shaft and in communication with the interior of the shaft, the outside of the steam chamber being formed by the inside of a ported impeller body supported from the shaft and by a ported sleeve which is mounted on the shaft and which opens and closes the ports in the impeller body upon the relative rotation of the body and sleeve, the impeller having outwardly directed wings, a shell mounted on the shaft and having an annular space adapted to be traversed by the wings, radially reciprocable gates carried by the shell and adapted to divide the annular space into a plurality of expansion chambers, the shell and ported sleeve being coupled together, and exhaust ports leading from the said annular space.

50. In a rotary steam engine, a hollow shaft, a steam chamber surrounding the shaft and in communication with the interior of the shaft, the outside of the steam chamber being formed by the inside of a ported impeller body supported from the shaft and by a ported sleeve which is mounted on the shaft and which opens and closes the ports in the impeller body upon the relative rotation of the body and sleeve, the impeller having outwardly directed wings, a shell mounted on the shaft and having an annular space adapted to be traversed by the wings, radially reciprocable gates carried by the shell and adapted to divide the annular space into a plurality of expansion chambers, a cam rotatable with the impeller, devices operable by the relative rotation of the cam and shell for moving each gate outwardly beyond a wing upon the approach thereof, and exhaust ports leading from the said annular space.

51. In a rotary steam engine, a hollow shaft, a steam chamber surrounding the shaft and in communication with the interior of the shaft, the outside of the steam chamber being formed by the inside of a ported impeller body supported from the shaft and by a ported sleeve which is mounted on the shaft and which opens and closes the ports in the impeller body upon the relative rotation of the body and sleeve, the impeller having outwardly directed wings, a shell mounted on the shaft and having an annular space adapted to be traversed by the wings, radially reciprocable gates carried by the shell and adapted to divide the annular space into a plurality of expansion chambers, a cam rotatable with the impeller, devices operable by the relative rotation of the cam and shell for moving each gate outwardly beyond a wing upon the approach thereof, cam operated means to apply lateral pressure to each gate when in its inner position, and exhaust ports leading from said annular space.

52. In a rotary steam engine, a hollow shaft, a steam chamber surrounding the shaft and in communication with the interior of the shaft, the outside of the steam chamber being formed by the inside of a ported impeller body supported from the shaft and by a ported sleeve which is mounted on the shaft and which opens and closes the ports in the impeller body upon the relative rotation of the body and sleeve, the impeller having outwardly directed wings, a shell mounted on the shaft and having an annular space adapted to be traversed by the wings, radially reciprocable gates carried by the shell and adapted to divide the annular space into a plurality of expansion chambers, exhaust ports leading from the said annular space, and means to couple either the impeller or shell to the shaft whereby the shaft is rotated by the passage of steam.

53. In a rotary steam engine, a hollow shaft, a steam chamber surrounding the shaft and in communication with the interior of the shaft, the outside of the steam chamber being formed by the inside of a ported impeller body supported from the shaft and by a ported sleeve which is mounted on the shaft and which opens and closes the ports in the impeller body upon the relative rotation of the body and sleeve, the impeller having outwardly directed wings, a shell mounted on the shaft and having an annular space adapted to be traversed by the wings, radially reciprocable gates carried by the shell and adapted to divide the annular space into a plurality of expansion chambers, a cam rotatable with the impeller, devices operable by the relative rotation of the cam and shell for moving each gate outwardly beyond a wing upon the approach thereof, exhaust ports leading from the said annular space, and means to couple either the impeller or shell to the shaft whereby the shaft is rotated by the passage of steam.

54. A rotary steam engine, comprising a hollow shaft having ports, a shaft-supported shell having an annular chamber intersected by a plurality of radially reciprocable gates and exhaust ports corresponding in number to the gates, a shaft-supported impeller having a plurality of wings fitting said annular chamber and an inlet port adjacent each wing, to receive steam from the ports in the shaft, cam operated devices synchronized with the impeller for moving the gates out of the path of an approaching wing, and means for coupling one of said shaft supported devices to apply lateral pressure and for freeing the gate from said lateral pressure during the movement of the gates.

64. In a rotary steam engine, a shaft, an impeller and a shell both carried on the shaft and being rotatable about the axis of the shaft relative to one another, the impeller having wings adapted to traverse an annular chamber in the shell, a plurality of gates of greater number than there are wings on the impeller, said gates being reciprocably carried in the shell and disposed across said chamber, cam operated devices for moving each gate outwardly upon the approach of a wing and for returning the gate after passage of the wing, and cam operated means to apply lateral pressure to each gate when in its inner position and for freeing the gate from said lateral pressure during the movement of the gates.

CHARLES H. SEAHOLM.

to the shaft, whereby relative rotation of the devices may be effected.

55. A rotary steam engine, comprising a hollow shaft having ports, a shaft-supported shell having an annular chamber intersected by a plurality of radially reciprocable gates and exhaust ports corresponding in number to the gates, a shaft-supported impeller having a plurality of wings fitting said annular chamber and an inlet port adjacent each wing to receive steam from the ports in the shaft, cam operated devices synchronized with the impeller for moving the gates out of the path of an approaching wing, and means for coupling one of said shaft supported devices to the shaft and for simultaneously preventing rotation of the other.

56. A rotary steam engine, comprising a hollow shaft having ports, a shaft-supported shell having an annular chamber intersected by a plurality of radially reciprocable gates and exhaust ports corresponding in number to the gates, a shaft-supported impeller having a plurality of wings fitting said annular chamber and an inlet port adjacent each wing, cam operated devices synchronized with the impeller for moving the gates out of the path of an approaching wing, a cut-off device carried with the shell and cooperable with the ports in the impeller and the ports in the shaft to control the admission of steam to the chamber, and means for coupling one of said shaft-supported devices to the shaft, whereby relative rotation of the devices may be effected.

57. A rotary steam engine, comprising a hollow shaft, a shaft-supported shell having an annular chamber intersected by a plurality of radially reciprocable gates and exhaust ports corresponding in number to the gates, a shaft-supported impeller having a plurality of wings fitting said annular chamber and an inlet port adjacent each wing, cam operated devices synchronized with the impeller for moving the gates out of the path of an approaching wing, a variable cut-off device carried with the shell and cooperable with the ports in the impeller to variably control the admission of steam to the chamber, actuating means for the variable cut-off device operable irrespective of the rotation of either of the shaft supported devices, and means for coupling one of said shaft supported devices to the shaft, whereby relative rotation of the devices may be effected.

58. A rotary steam engine, comprising a hollow shaft, a shaft-supported shell having an annular chamber intersected by a plurality of radially reciprocable gates and exhaust ports corresponding in number to the gates, a shaft-supported impeller having a plurality of wings fitting said annular chamber and an inlet port adjacent each wing, cam operated devices synchronized with the impeller for moving the gates out of the path of an approaching wing, a variable cut-off device carried with the shell and cooperable with the ports in the impeller to variably control the admission of steam to the chamber, actuating means for the variable cut-off device operable irrespective of the rotation of either of the shaft supported devices, and means for coupling one of said shaft supported devices to the shaft and for simultaneously preventing rotation of the other.

59. A rotary steam engine having cooperative parts rotatable in opposite directions relative to an axis, a cut-off sleeve rotatable with one of the parts for controlling steam passage in the other part, and including a device angularly movable in response to a movement thereof along said axis for varying the steam cut off.

60. A rotary steam engine, having a hollow shaft functioning for steam admission and for power transmission, means for driving the shaft in either direction in response to the flow of steam through the engine, and means for varying the cut-off of steam while the engine is in operation.

61. In a rotary steam engine, a hollow shaft having lateral openings, a steam chamber sleeve mounted on the shaft about said lateral openings, a variable cut-off sleeve carried by the steam-chamber sleeve, an impeller having a cylindrical body rotatably carried on the sleeve, a plurality of wings extending outwardly from the body, and ports in the wall of the body adjacent each wing, a cam plate fastened to the impeller, a shell coupled to the steam chamber sleeve, devices associated with the shell and the cam for causing reaction between the impeller and shell, clutch means adapted to connect either the impeller or shell to the shaft, and means for actuating the variable cut-off sleeve irrespective of which part is coupled.

62. In a rotary steam engine, a shaft, a cam plate, and a shell, one of which is rotatable on the shaft relative to the other, a plurality of gates reciprocably carried inside the shell, means associated with the gates and operated by the cam in response to rotation of one of said parts relative to the other for reciprocating the gates, means for applying lateral pressure to each gate when it is in its inner position, and means for freeing the gate from said lateral pressure during the movement of the gates.

63. In a rotary steam engine, a shaft, a cam plate, and a shell, one of which is rotatable on the shaft relative to the other, a plurality of gates reciprocably carried inside the shell, means associated with the gates and operated by the cam in response to rotation of one of said parts relative to the other for reciprocating the gates, locking members carried by the shell adjacent the gates, and cam operated means for forcing the locking members against the gates when in their inner position